INVENTOR
RAY E. TROENDLY
BY Scrivener & Parker
ATTORNEYS ic Office 2,873,348
Patented Feb. 10, 1959

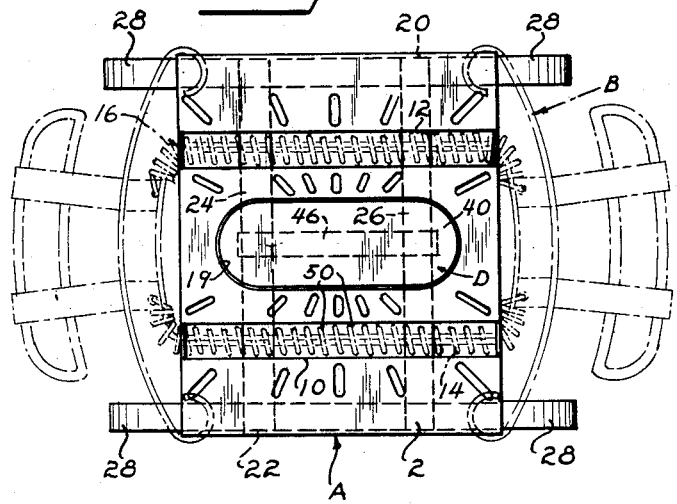
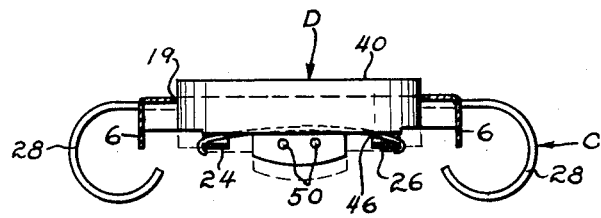
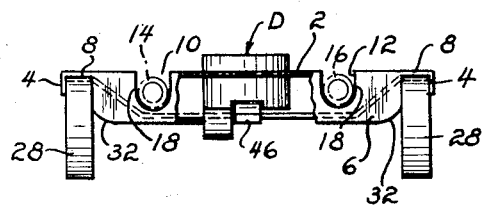

2,873,348

SUPPORTING AND HEATING DEVICE FOR CASSEROLES AND THE LIKE

Ray E. Troendly, Elkton, Oreg., assignor to Troendly Illinois Corporation, Melrose Park, Ill., a corporation of Delaware Application July 17, 1957, Serial No. 672,469

1 Claim. (Cl. 219—37)

This invention relates to devices for heating or keeping warm some article or apparatus such as a container for foods, such as a casserole, coffee pot or tea pot.

In its normal use a casserole, with food within it, is heated in an oven or the like to cook the food, after which it is transferred to the table. It is often desirable to keep the food within the casserole warm until it is consumed, without heating it sufficiently to continue the cooking. It has been a principal object of the present invention to provide a device of new and improved construction on which a casserole or the like may be placed for warming and which includes a heating device, together with means which maintain the heating device constantly in engagement with the container which is on the heating device.

In my co-pending application Serial No. 635,046, filed January 18, 1957, for Holder for Containers Such as Casseroles and the Like, I have discolsed and claimed a new and improved device for holding container such as casseroles, which are hot when used. The casserole holder disclosed in my co-pending application has two spaced, parallel pairs of slidably related bars, each of which pairs is surrounded by a helical coil spring. These bar and spring assemblies form an important part of the holder and a casserole or the like is supported on them when within the holder. Thus, a further principal object of the present invention has been to provide a stand or supporting device, including a heating element, on which a holder for casseroles and the like such as disclosed and claimed in my co-pending application may be supported, which stand or supporting device will be constructed to receive and accommodate the spaced, parallel assemblies of a pair of bars and a surrounding spring to thereby permit the lower surface of the casserole to engage the upper surface of the supporting device and the heating element in close, face-to-face abutting relation.

The invention is described in the following specification and an embodiment is illustrated in the accompanying drawings, in which:

Fig. 1 is a top plan view of a supporting and heating device according to the invention, being shown associated with a casserole holding device;

Fig. 2 is a partly sectional and partly elevational view taken on line 2—2 of Fig. 1;

Fig. 3 is an end view of the device, with parts broken away, and

Figure 4:
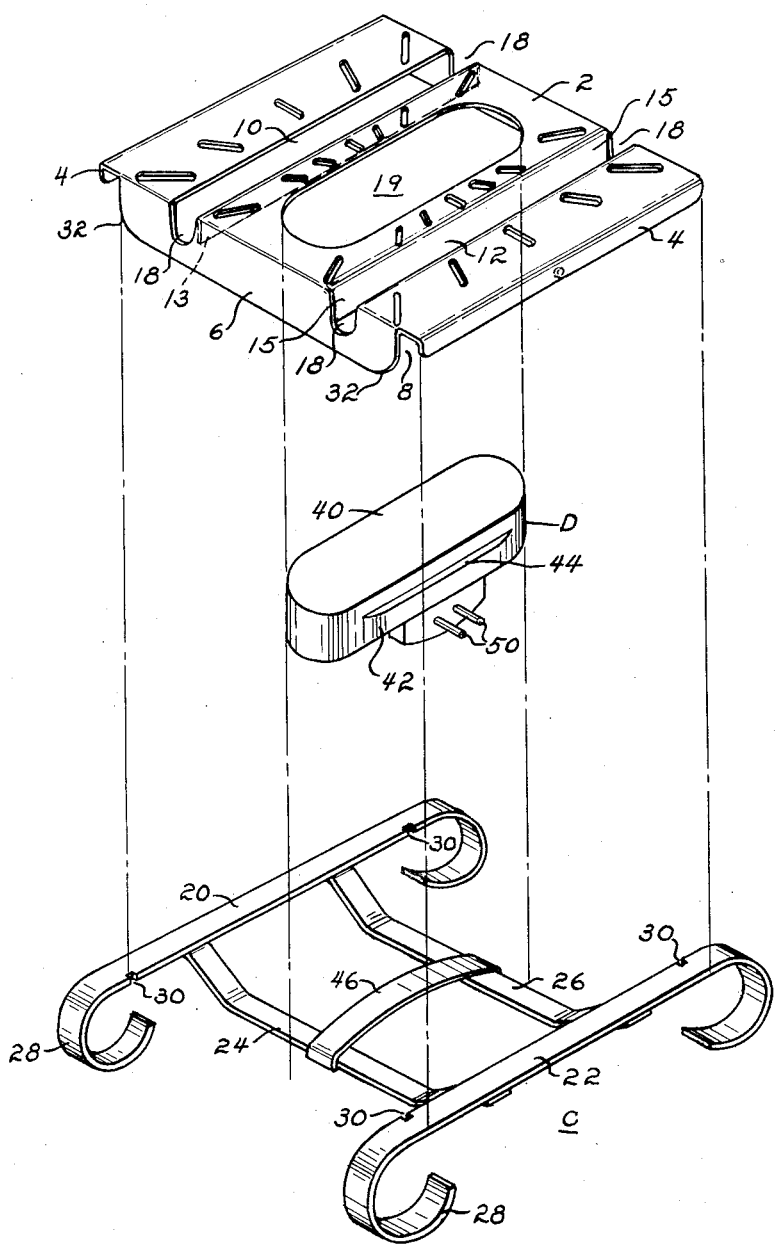
Fig. 4 is an exploded perspective view of the device shown in Figs. 1 to 3.

The embodiment of this invention which is shown in the drawings comprises a stand or supporting member A formed of metal or other suitable material having a generally flat upper surface part 2 and side walls 4 and end walls 6 which depend from the upper surface part 2. At each of their ends the end walls 6 terminate short of the side walls 4, as shown at 8, for a purpose which will be described hereinafter.

The upper surface part 2 is formed with two elongated, parallel openings 10, 12 which are perferably equidistantly located at opposite sides of the longitudinal center line of the upper surface 2 and are spaced apart sufficiently to permit them to receive the spaced bar and spring assemblies 14, 16 of a casserole holder B which is shown in dot and dash lines in Fig. 1 and which is of the type and construction disclosed in my co-pending application referred to above. The end walls 6 are provided with shallow openings 18 which extend downwardly from the upper surface part 2 in alignment with the openings 10, 12 and which stop short of the lower edges of the end walls 6. It will be seen that the openings 10, 12 and 18 provide spaced troughs within which the two bar and spring assemblies of the casserole holder B may be received. At its center, midway between the spaced troughs described above, the upper surface part 2 is provided with an elongated, wide opening 19 for a purpose to be described hereinafter.

The elongated, parallel openings 10, 12 in the upper surface part 2 are formed by bending the material of the part 2 downwardly along the inner edges thereof to a position substantially normal to the surface part 2, thereby providing two walls or surfaces 13, 15 which extend from end to end of the stand and are positioned on opposite sides of the central opening 19 and provide means for shielding the side bar and spring assemblies 14, 16 of a casserole holder supported on the stand from the heat of a heating device positioned within the central opening 19 as will be described hereinafter. The spaced troughs formed by the elongated openings 10, 12 and the end wall openings 18 are sufficiently deep that the spring and side bar assemblies 14, 16 which are positioned within the troughs when a casserole holder is supported on the stand, are entirely below the upper surface part 2. Thus, these assemblies are out of contact with the hot bottom of a casserole supported on the surface 2 and an air gap is therefore formed between the bottom of the casserole and the side bar and spring assemblies, thereby keeping such assemblies cool.

Means are provided by the invention for supporting the upper surface part and its depending edge parts on and above the surface of a table or other structure and such means comprise a unitary assembly C which comprises two spaced parallel elongated bars 20, 22 connected by two spaced, parallel cross bars 24, 26. The bars 20, 22 have downturned end parts 28 of equal length, the lower ends of which engage the table top or other structure. Each of the bars 20, 22 is provided on its inner edges with two spaced notches 30, 30. Each of these notches is aligned with one of the notches on the other bar and the notches of each bar are spaced apart by a distance equal to that between the end walls 6. Each notch 30 is of such depth that the distance between its bottom and the outer edge of the bar in which it is formed is equal to the distance between one end of end wall 6 and the adjacent side wall 4. Both ends of each end wall 6 are downwardly and inwardly curved, as shown at 32, and when it is desired to assemble the supporting surface part A with the stand or leg part B the ends of the end wall 6 are placed in the notches 30 and the assembly A is snapped into place by pressing it downwardly, thus securely but releaseably connecting the two parts into a single assembly.

Heating means of new and improved construction and arrangement are provided by the invention and comprise a member D which has an upper part 40 of substantially the same size and shape as the opening 19 in the supporting surface part 2 of member A and a larger lower part 42, the two being separated by a ridge or shoulder 44. This member D is inserted into the opening 19 in part A from the bottom until the shoulder 44 engages the lower surface of the supporting surface 2 and it is resiliently supported in this position by an upwardly bowed spring 46 which is supported at its ends on the cross bars 24, 26 of member C, as shown particularly in Fig. 4. The member D has an electrical heating element (not shown) embedded in it which is connected to plugs 50 by which electrical energy may be supplied to the heating element.

In the use and operation of a heating or warming device according to the invention the parts A, C and D thereof are assembled in the described manner, the device is placed on a table or other structure and the heating coil embedded in member D is energized by connecting the plugs 50 to a source of electrical energy. A casserole holder B, with a casserole within it, as described in my aforesaid co-pending application, is now placed on the supporting surface 2. The two spaced, parallel bar and spring assemblies of the casserole holder will be received within the two spaced, parallel troughs formed in the surface part 2 and the lower surface of the bottom of the casserole will therefore rest upon the upper surface of the supporting surface 2 of member A and will also engage the upper surace of the heating member D, forcing that member downwardly against the force of spring 46 which thereafter holds the heating element firmly and closely in engagement with the lower surface of the casserole. Because of the depth of the troughs formed by the openings 10, 12 and 18 the bar and spring assemblies of the casserole holder are positioned entirely below the supporting surface 2, thus providing an air gap between the bar and spring assemblies and the hot bottom of the casserole resting on the supporting surface 2. The bar and spring assemblies are thus removed from the heat of the casserole and are also shielded from the heat of the heating element D by the walls 13, 15 which extend along the inner side of each of the troughs. The parts of the device according to the invention may be easily and quickly disassembled for cleaning and thereafter quickly and easily assembled.

While I have described and illustrated one embodiment of my invention it will be apparent to those skilled in the arts to which it relates that other embodiments, as well as modifications of that disclosed, may be made and practiced without departing in any way from the spirit or scope of the invention, for the limits of which reference must be made to the appended claim.

What is claimed is:

A device for supporting casseroles and the like on a table or other structure and supplying heat thereto, comprising a member having a flat supporting surface and walls depending from the opposite ends thereof, legs supporting said member, said flat supporting surface having two spaced, elongated, narrow, parallel openings therein which extend from end wall to end wall, and said end walls having openings therein aligned with and extending downwardly from the two openings in said flat supporting surface and terminating above the lower edges of the end walls, whereby the openings in said supporting surface and end walls form parallel troughs for the reception of spaced parallel parts of a casserole holder or the like, said flat supporting surface having a central opening therein between said parallel openings therein, a heating element movably mounted for vertical movement within said central opening and having a flat upper surface, and resilient means constantly urging said heating element upwardly to a position in which its upper surface is above said flat supporting surface.

References Cited in the file of this patent

UNITED STATES PATENTS

| | | |
|---|---|---|
| 133,102 | Hollings | Nov. 19, 1872 |
| 1,191,197 | Kuhn et al. | July 18, 1916 |
| 1,220,235 | Keen | Mar. 27, 1917 |
| 1,220,414 | Gordon | Mar. 27, 1917 |
| 1,682,849 | Morey | Sept. 4, 1928 |
| 1,879,880 | Lindsey | Sept. 27, 1932 |
| 2,140,479 | Myers et al. | Dec. 13, 1938 |
| 2,180,657 | Anderson | Nov. 21, 1939 |
| 2,202,630 | Hauber | May 28, 1940 |
| 2,263,350 | Challet | Nov. 18, 1941 |
| 2,460,625 | Ellis | Feb. 1, 1949 |

FOREIGN PATENTS

| | | |
|---|---|---|
| 114,437 | Great Britain | Apr. 11, 1918 |
| 1,103,311 | France | May 18, 1918 |